United States Patent
Deng et al.

(10) Patent No.: US 12,083,982 B1
(45) Date of Patent: Sep. 10, 2024

(54) CURTAIN AIRBAG ASSEMBLY WITH INFLATABLE FLAP

(71) Applicant: Ford Global Technologies, LLC, Dearborn, MI (US)

(72) Inventors: Zhibing Deng, Northville, MI (US); Joseph E. Abramczyk, Farmington Hills, MI (US); Shekar Prabhakar Erasala, Northville, MI (US); Lavanya Vemuri, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/194,893

(22) Filed: Apr. 3, 2023

(51) Int. Cl.
    *B60R 21/232* (2011.01)
    *B60R 21/2338* (2011.01)
    *B60R 21/26* (2011.01)

(52) U.S. Cl.
    CPC ........ *B60R 21/232* (2013.01); *B60R 21/2338* (2013.01); *B60R 21/26* (2013.01)

(58) Field of Classification Search
CPC ... B60R 21/213; B60R 21/214; B60R 21/217; B60R 21/232; B60R 21/233; B60R 21/2338; B60R 21/26; B60R 2021/23386
See application file for complete search history.

(56) References Cited

U.S. PATENT DOCUMENTS

| | | | |
|---|---|---|---|
| 5,924,722 A * | 7/1999 | Koide | B60R 22/1952 280/730.2 |
| 6,276,712 B1 * | 8/2001 | Welch | B60R 21/232 280/730.2 |
| 6,338,498 B1 | 1/2002 | Niederman et al. | |
| 6,676,154 B2 * | 1/2004 | Fischer | B60R 21/232 280/730.2 |
| 7,077,425 B2 * | 7/2006 | Ogawa | B60R 21/213 280/730.2 |
| 7,213,839 B2 * | 5/2007 | Lockwood | B60R 21/233 280/743.2 |
| 7,226,077 B2 * | 6/2007 | Abe | B60R 21/235 280/736 |
| 7,261,316 B1 * | 8/2007 | Salmo | B60R 21/232 280/730.2 |
| 7,390,016 B2 | 6/2008 | Noguchi et al. | |
| 7,766,374 B2 * | 8/2010 | Abele | B60R 21/2338 280/743.2 |
| 7,988,191 B2 * | 8/2011 | Weyrich | B60R 21/231 280/736 |
| 8,007,000 B2 * | 8/2011 | Gammill | B60R 21/232 280/730.2 |
| 8,196,952 B2 * | 6/2012 | Walston | B60R 21/2171 280/730.2 |
| 8,235,418 B2 | 8/2012 | Slaats et al. | |
| 8,408,591 B2 | 4/2013 | Walston | |

(Continued)

*Primary Examiner* — Laura Freedman
(74) *Attorney, Agent, or Firm* — Frank A. MacKenzie; Bejin Bieneman PLC (57) ABSTRACT

An assembly for a vehicle includes an airbag inflator. The assembly includes a curtain airbag including a main lobe and an inflatable flap. The main lobe and the inflatable flap are each inflatable by the airbag inflator to an inflated position. The main lobe includes an inboard panel and an outboard panel. The inflatable flap is at the inboard panel in the inflated position. The inflatable flap, in the inflated position, is at the inboard panel and abutting the airbag inflator.

19 Claims, 7 Drawing Sheets

(56) References Cited

U.S. PATENT DOCUMENTS

| | | | |
|---|---|---|---|
| 8,414,021 B2* | 4/2013 | Tanaka | B60R 21/2334 |
| | | | 280/730.2 |
| 8,505,963 B1* | 8/2013 | Lewis | B60R 21/2171 |
| | | | 280/741 |
| 8,820,779 B1* | 9/2014 | Low | B60R 21/232 |
| | | | 280/728.2 |
| 9,016,717 B1 | 4/2015 | Clauser | |
| 9,187,055 B1* | 11/2015 | Genthikatti | B60R 21/233 |
| 9,290,150 B2* | 3/2016 | Gaiser | B60R 21/2171 |
| 10,486,637 B2* | 11/2019 | Thomas | B60R 21/216 |
| 10,787,145 B2* | 9/2020 | Berntsson | B60R 21/23138 |
| 10,864,881 B2* | 12/2020 | Park | B60R 21/207 |
| 10,940,823 B2 | 3/2021 | Menger et al. | |
| 10,960,842 B2* | 3/2021 | Shimizu | B60R 21/232 |
| 11,117,544 B2* | 9/2021 | Moran | B60R 21/2346 |
| 11,148,632 B2* | 10/2021 | Karuppaswamy | B60R 21/213 |
| 11,370,380 B1 | 6/2022 | Abramczyk et al. | |
| 11,623,599 B2* | 4/2023 | Schaefer | B60R 21/2334 |
| | | | 280/730.2 |
| 2016/0001732 A1 | 1/2016 | Asada et al. | |
| 2019/0161045 A1* | 5/2019 | Thomas | B60R 21/2338 |
| 2022/0332273 A1* | 10/2022 | Fischer | B60R 21/261 |
| 2022/0388473 A1* | 12/2022 | Schmid | B60R 21/217 |

* cited by examiner

CURTAIN AIRBAG ASSEMBLY WITH INFLATABLE FLAP

BACKGROUND

During certain vehicle impact, occupants may move in a direction influenced by the momentum of a vehicle. In certain vehicle impacts, e.g., side impact, frontal offset impacts, far side oblique impacts, near side oblique impacts, etc., may cause the occupants to move cross-vehicle and/or at an angle towards vehicle components, e.g., toward a pillar, door, etc. Occupant injury risk is dependent upon specific crash scenarios.

DETAILED DESCRIPTION

Figure 6:
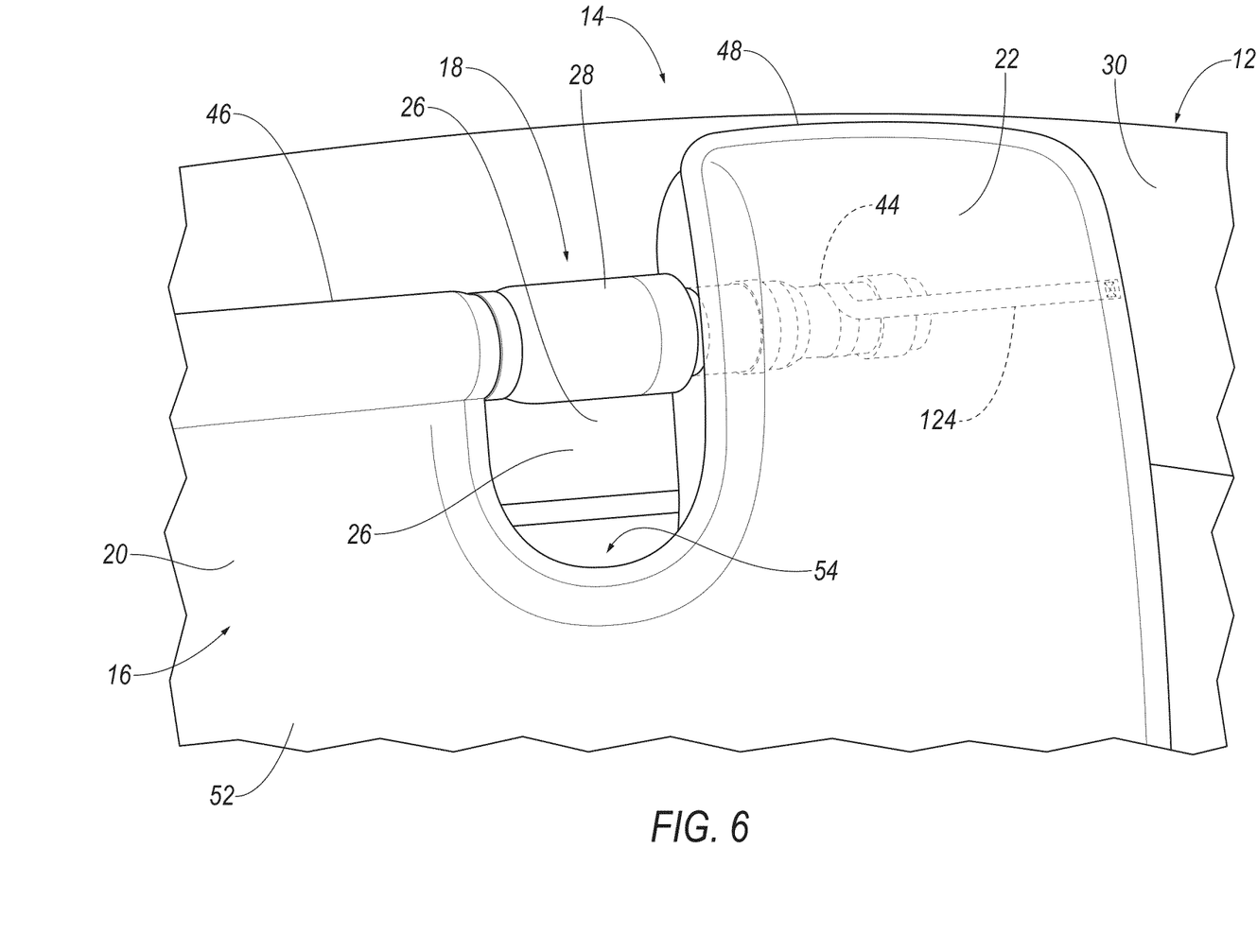
FIG. 6 is a magnified portion of another example of the curtain airbag assembly.

With reference to the Figures, wherein like numerals indicate like parts throughout the several views, a vehicle 10 includes a vehicle roof 12 and a curtain airbag assembly 14. The curtain airbag assembly 14 includes a curtain airbag 16 supported by the vehicle roof 12 and an airbag inflator assembly 18 mounted to the vehicle roof 12. The curtain airbag 16 includes a main lobe 20 and an inflatable flap 22. The main lobe 20 and the inflatable flap 22 each are inflatable by the airbag inflator assembly 18 from an uninflated position (FIG. 1) to an inflated position (FIGS. 2, 3, 6). The main lobe 20 in the inflated position extends downwardly from the vehicle roof 12. The inflatable flap 22 in the inflated position abuts the airbag inflator assembly 18 and is vehicle-inboard relative to the airbag inflator assembly 18. The curtain airbag 16 includes a tether 24, 124 connecting the inflatable flap 22 to the airbag inflator assembly 18 in the inflated position.

In the event of certain vehicle impacts, the curtain airbag 16 may inflate to control the kinematics of an occupant. Since the inflatable flap 22 abuts the airbag inflator assembly 18 in the inflated position, the inflatable flap 22 may control the kinematics of the occupant at the airbag inflator assembly 18 in the event of certain vehicle impacts. Specifically, since the inflatable flap 22 is vehicle-inboard of the airbag inflator assembly 18, the inflatable flap 22 is between the occupant and the airbag inflator assembly 18. The tether 24, 124 positions the inflatable flap 22 relative to the airbag inflator assembly 18 and controls the geometry of the inflatable flap 22 relative to the main lobe 20.

Figure 7:
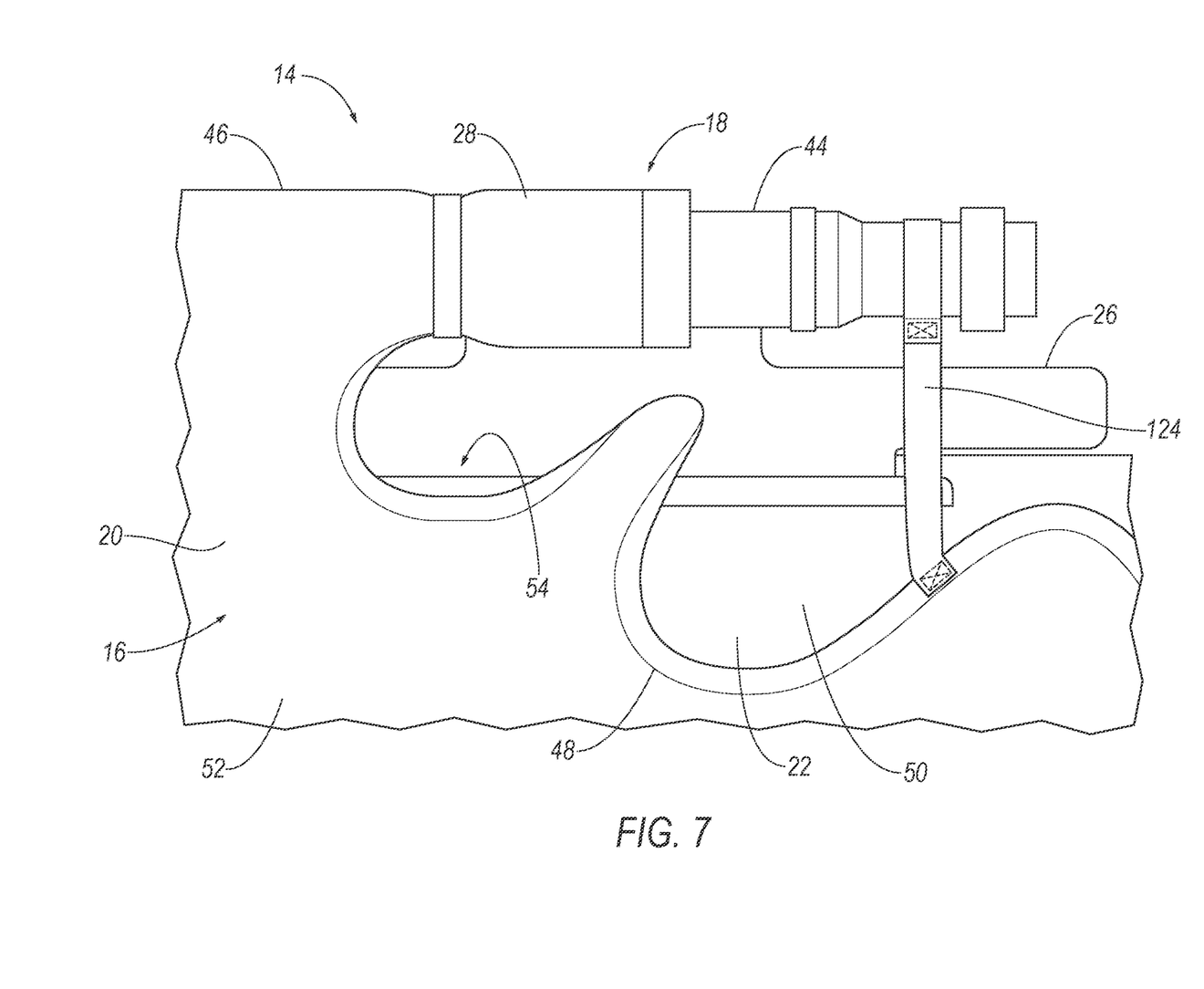
FIG. 7 is a perspective view of the curtain airbag assembly with a curtain airbag uninflated and unfolded and with an inflatable flap folded over on itself.

Two examples of the curtain airbag assembly 14 are shown in the Figures and common numerals are used to identify common features in the example embodiments. The airbag inflator assembly 18 includes a bracket 26 mounted to the vehicle roof 12 and an airbag inflator 28 supported by the bracket 26. One example of the curtain airbag assembly 14 is shown in FIGS. 2-5. In such an example, the tether 24 is anchored to the bracket 26 and to the inflatable flap 22 in the inflated position, as described further below. Another example of the curtain airbag assembly 14 is shown in FIGS. 6-7. In such an example, the tether 124 is anchored to the airbag inflator 28 and to the inflatable flap 22.

Figure 1:
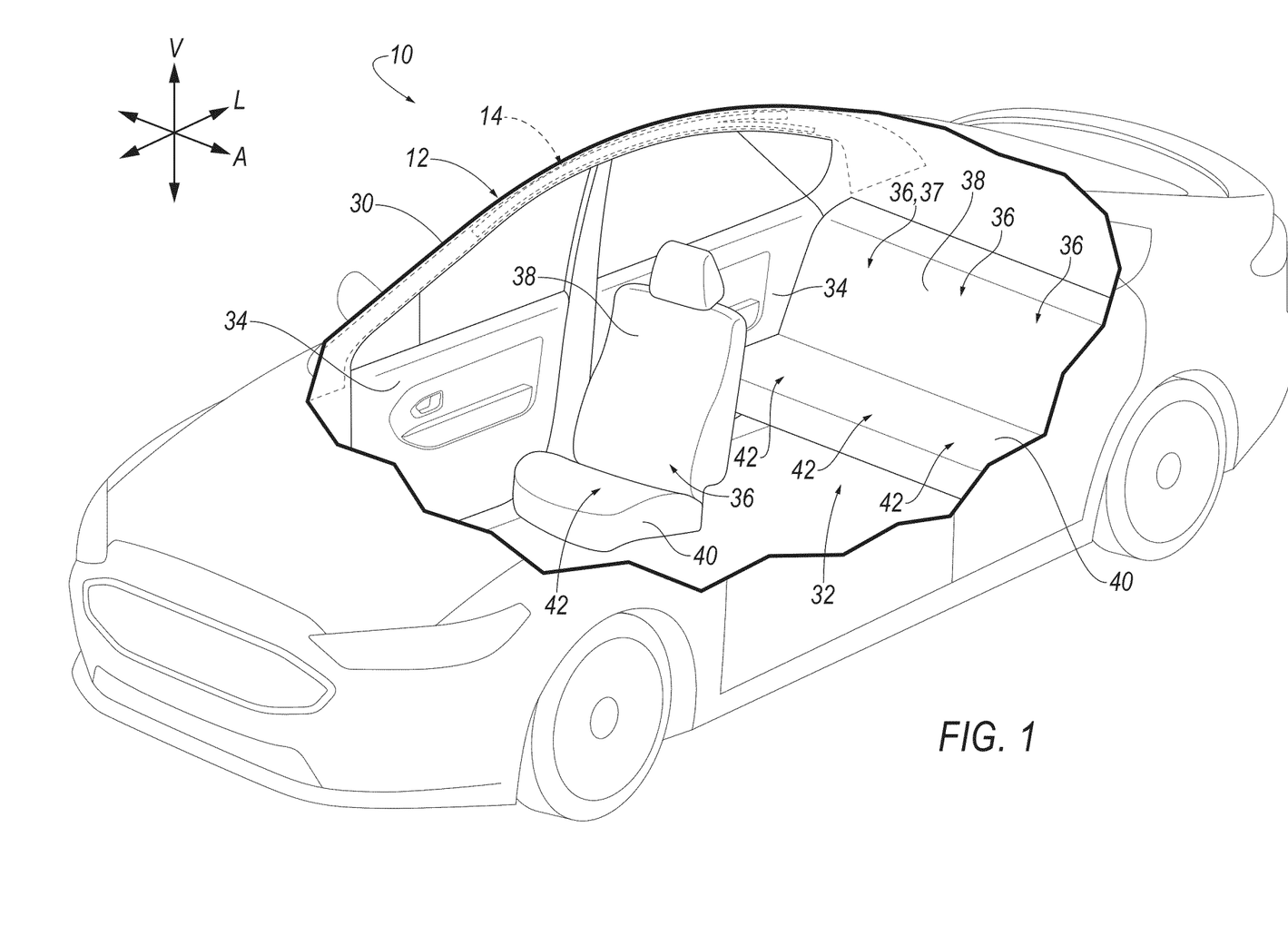
FIG. 1 is a perspective view of a vehicle including a curtain airbag assembly in an uninflated position.
Figure 2:
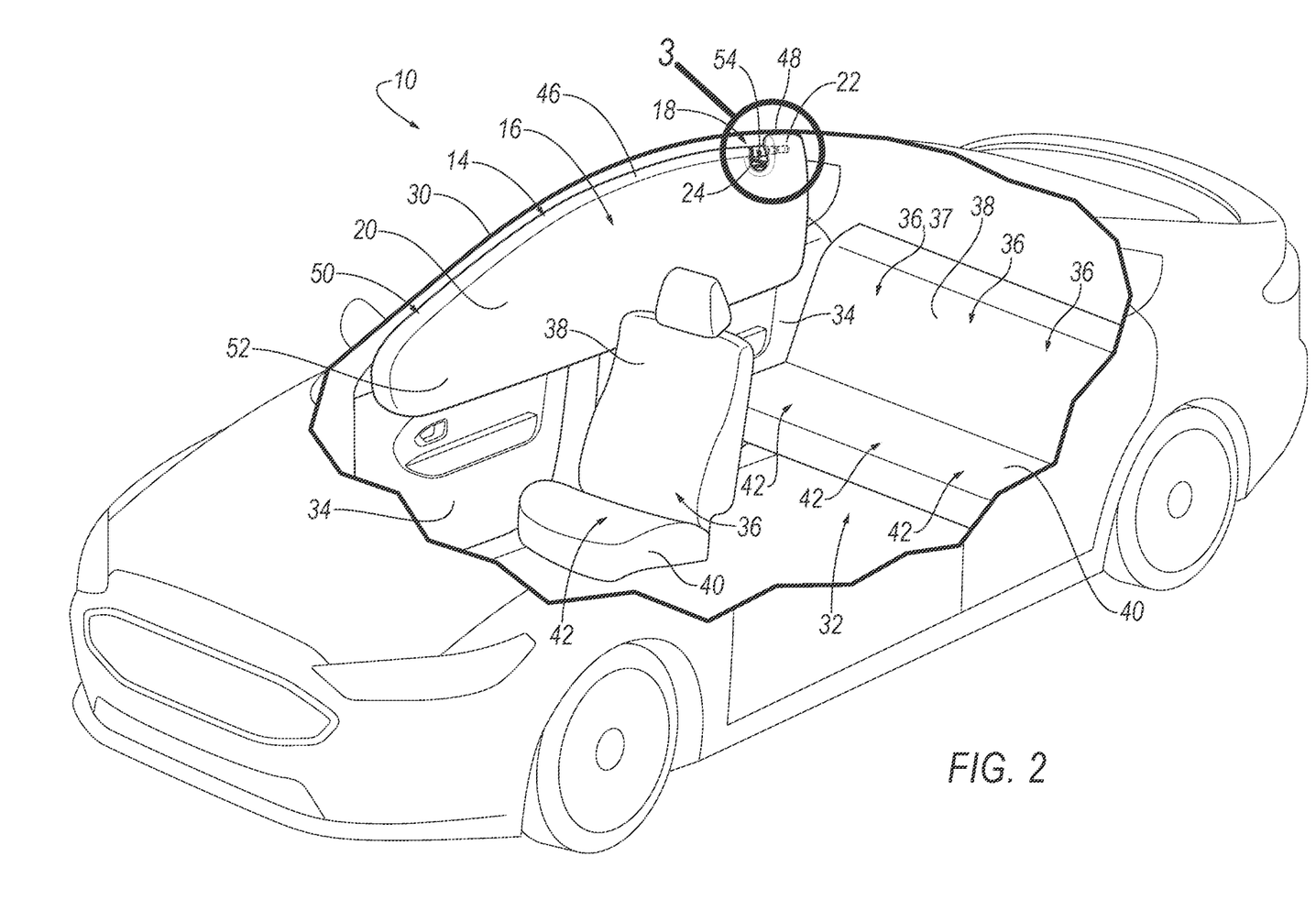
FIG. 2 is a perspective view of the vehicle including the curtain airbag assembly in an inflated position.
Figure 3:
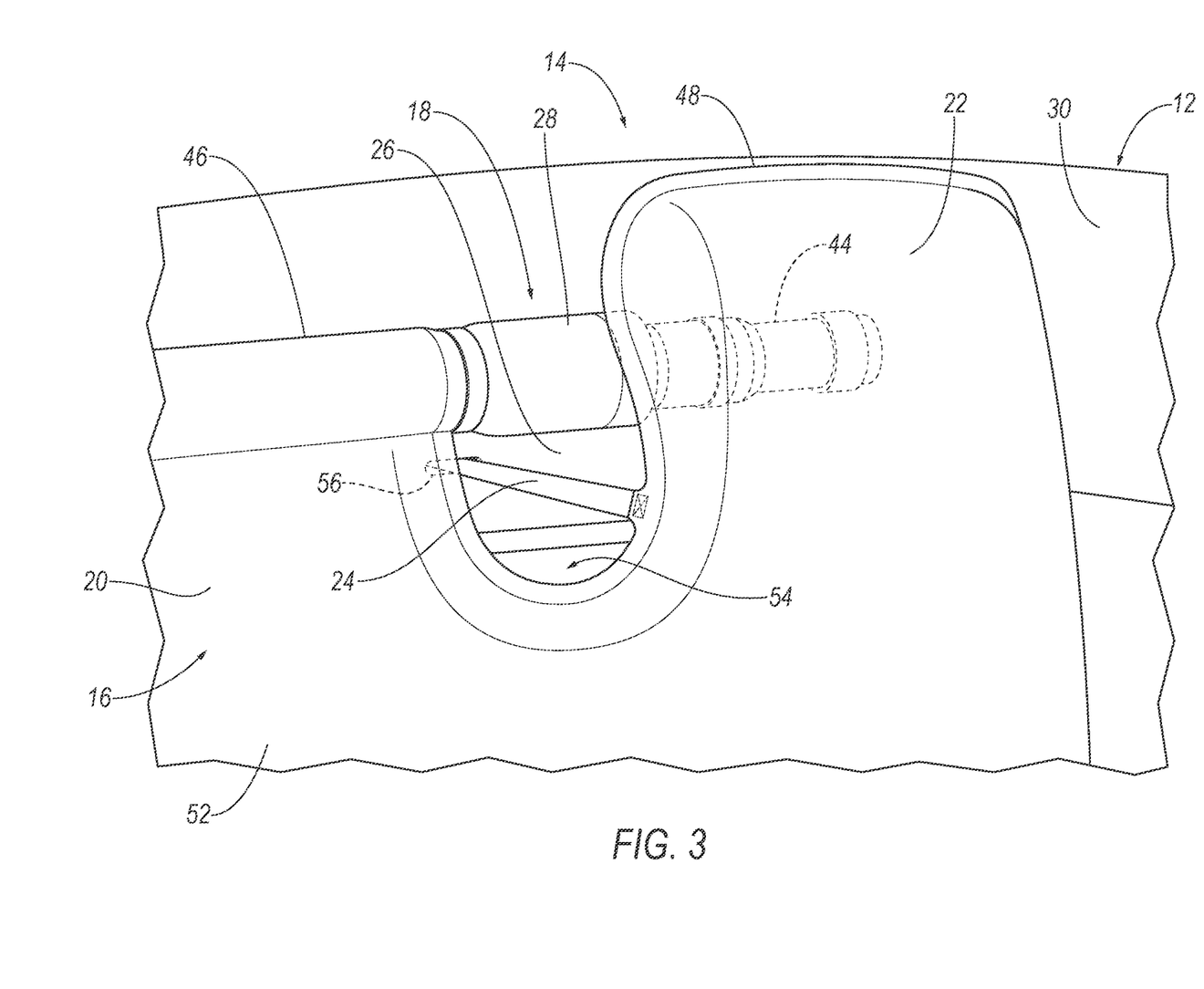
FIG. 3 is a magnified portion of FIG. 2 including an inflatable flap and a notch between the inflatable flap and a main lobe.

With reference to FIGS. 1 and 2, the vehicle 10 may be any suitable type of automobile, e.g., a passenger or commercial automobile such as a sedan, a coupe, a truck, a sport utility, a crossover, a van, a minivan, a taxi, a bus, etc. The vehicle 10, for example, may be autonomous. In other words, the vehicle 10 may be autonomously operated such that the vehicle 10 may be driven without constant attention from a driver, i.e., the vehicle 10 may be self-driving without human input.

With reference to FIG. 1, the vehicle 10 defines a vehicle-longitudinal axis L extending between a front end (not numbered) and a rear-end (not numbered) of the vehicle 10. The vehicle 10 defines a vehicle-lateral axis A extending cross-vehicle from one side to the other side of the vehicle 10. The vehicle 10 defines a vertical axis V extending through a vehicle 10 floor and the vehicle roof 12. The vehicle-longitudinal axis L, the vehicle-lateral axis A, and the vertical axis V are perpendicular relative to each other.

The vehicle 10 includes a vehicle body. As one example, the vehicle body may be of a unibody construction. In the unibody construction, the body, e.g., rockers, serves as a frame, and the body (including the rockers, pillars, roof rails 30 of the vehicle roof 12, etc.) is unitary, i.e., a continuous one-piece unit. As another example, the vehicle body and frame may have a body-on-frame construction (also referred to as a cab-on-frame construction). In other words, the vehicle body and frame are separate components, i.e., modular, and the vehicle body is supported on and affixed to the frame. In other examples, the vehicle body may have any suitable construction. The vehicle body may be of any suitable material, for example, steel, aluminum, etc.

The vehicle body includes body panels partially defining an exterior of the vehicle 10. The body panels may present a class-A surface, e.g., a finished surface exposed to view by a customer and free of unaesthetic blemishes and defects. The body panels include, for example, a roof panel of the vehicle roof 12, etc.

The vehicle roof 12 may include a pair of roof rails 30. The roof rails 30 are spaced from one another in a cross-vehicle direction. The roof rails 30 each extend longitudinally along the vehicle body, i.e., along the longitudinal axis of the vehicle 10. The one of the roof rails 30 may extend along the passenger side of a passenger compartment 32 and the other of the roof rails 30 may extend along the driver side of the passenger compartment 32. The assembly is supported one of the roof rails 30 of the vehicle body. The roof rails 30 may support the roof panel of the vehicle 10. The roof panel may span the passenger compartment 32 from front to rear and left to right.

The vehicle body defines the passenger compartment 32 to house occupants, if any, of the vehicle 10. The passenger compartment 32 may extend across the vehicle 10, i.e., from one side to the other side of the vehicle 10. The passenger compartment 32 includes a front end and a rear end with the front end being in front of the rear end during forward movement of the vehicle 10. The passenger compartment 32 includes a left side and a right side.

The vehicle 10 may include a headliner (not shown) supported by the vehicle body, e.g., by the vehicle roof 12. The headliner may be mounted adjacent the vehicle roof 12 at a top of the passenger compartment 32. The headliner may conceal the vehicle roof 12, e.g., the roof rails 30 and the roof panel, from inside the passenger compartment 32. The headliner includes a class-A surface facing the passenger compartment 32, i.e., a surface specifically manufactured to have a high quality, finished, aesthetic appearance free of blemishes.

With continued reference to FIGS. 1 and 2, the vehicle 10 includes vehicle doors 34 openable for occupants to enter and exit a passenger cabin. The roof rails 30 contact a top edge of the vehicle doors 34.

With continued reference to FIGS. 1 and 2, the vehicle 10 may include one or more seats 36. Specifically, the vehicle 10 may include any suitable number of seats 36. The seats 36 are supported by the vehicle floor (not numbered). The seats 36 may be arranged in any suitable arrangement in the passenger compartment 32. One or more of the seats 36 may be at the front end of the passenger compartment 32, e.g., a front row of seats 36. One or more of the seats 36 may be behind the front end of the passenger compartment 32, e.g., at the rear end of the passenger compartment 32 as a rear row of seats 36. In the example shown in the Figures, the seats 36 are arranged as a rear row of seats 36, i.e., a bench including more than one seat 36. The rear row of seats 36 in the Figures may be, in some examples, a second row or a third row of seats 36. The seats 36 of the rear row of seats 36 may be referred to as rear vehicle seats (also identified with reference numeral 37).

Each of the seats 36 include a seatback 38 and a seat bottom 40 and may include a head restraint. The head restraint may be supported by and extends upwardly from the seatback 38. In other words, in such an example the weight of the head restraint is borne by the seatback 38. The seatback 38 may be supported by the seat bottom 40 and may be stationary or movable relative to the seat bottom 40. The seatback 38 may extend from an upper end to a lower end. The lower end may be connected to the seat bottom 40. The upper end of the seatback 38 may be spaced upwardly from the lower end of the seatback 38, i.e., upwardly from the seat bottom 40. The head restraint may extend upwardly from the upper end of the seatback 38. The seatback 38, the seat bottom 40, and the head restraint may be adjustable in multiple degrees of freedom. Specifically, the seatback 38, the seat bottom 40, and the head restraint may themselves be adjustable. In other words, adjustable components within the seatback 38, the seat bottom 40, and the head restraint may be adjustable relative to each other.

The seat 36, e.g., the seatback 38 and the seat bottom 40, may define at least one occupant-seating area 42. The occupant-seating area 42 is the space occupied by an occupant properly seated on the seat 36. The occupant-seating area 42 is seat-forward of the seatback 38 and above the seat bottom 40.

The curtain airbag assembly 14 includes the curtain airbag 16 and the airbag inflator assembly 18. The curtain airbag 16 inflator is in fluid communication with the curtain airbag 16. Specifically, the main lobe 20 and the inflatable flap 22 each are inflatable by the airbag inflator assembly 18 to the inflated position.

One curtain airbag assembly 14 is shown in the Figures on the right side of the vehicle 10. The vehicle 10 may include another curtain airbag assembly 14 on the left side of the vehicle 10. The curtain airbag assemblies 14 may be similar or identical to each other and maybe mirror images of each other.

As set forth above, the airbag inflator assembly 18 includes the bracket 26 mounted to the vehicle roof 12 and the airbag inflator 28 supported by the bracket 26. In the example shown in the Figures, the airbag inflator assembly 18 is aligned with the rear vehicle seat 36, 37 along the vehicle-longitudinal axis L. Specifically, the airbag inflator assembly 18 shown in the Figures is aligned with the seatback 38 of the rear vehicle seat 36, 37 along the vehicle-longitudinal axis L.

The airbag inflator 28 expands the curtain airbag 16 with inflation medium, such as a gas, to move the curtain airbag 16 from an uninflated position to an inflated position. The airbag inflator 28 may be, for example, a pyrotechnic inflator that ignites a chemical reaction to generate the inflation medium, a stored gas inflator that releases (e.g., by a pyrotechnic valve) stored gas as the inflation medium, or a hybrid. The airbag inflator 28 includes a housing 44, e.g., cylindrical in the example shown in the Figures, that is elongated and houses a pyrotechnic charge and associated hardware to produce the inflation medium upon activation by the vehicle 10, i.e., in response to activation from a restraints control module in response to detection of certain vehicle impacts.

As set forth above, the curtain airbag assembly 14 may be supported by the vehicle roof 12, i.e., the weight of the curtain airbag assembly 14 is borne by the vehicle roof 12 in the uninflated position and the inflated position. For example, the curtain airbag assembly 14 may be supported by the roof rail 30. Specifically, the curtain airbag 16 and the airbag inflator assembly 18 may be supported by the roof rail 30. The bracket 26 of the airbag inflator assembly 18 may be mounted to the vehicle roof 12, e.g., the roof rail 30. In such an example, the airbag inflator 28 is supported by the bracket 26 in the uninflated position and the inflated position and the curtain airbag 16 is supported by at least the airbag inflator 28 in the inflated position. The bracket 26 may be mounted to the roof rail 30 in any suitable manner, e.g., fasteners. The curtain airbag assembly 14 may be concealed behind the headliner in the uninflated position.

In the inflated position, the curtain airbag 16 extends along the roof rail 30 longitudinally in the vehicle 10, i.e., along the longitudinal axis L of the vehicle 10. The curtain airbag 16 may extend from the front end of the passenger compartment 32 to the rear end of the passenger compartment 32 along the roof rail 30 of the vehicle body. The curtain airbag 16 may be elongated along the longitudinal axis L of the vehicle 10, as shown in the example in the Figures, i.e., the longest dimension of the curtain airbag 16 is along the longitudinal axis L.

The curtain airbag 16 extends downwardly from the vehicle roof 12 in the inflated position. The curtain airbag 16 extends between the doors 34 and occupant-seating areas 42 when the airbag is in the inflated position, i.e., adjacent the occupant. Specifically, the main lobe 20 extends downwardly from the vehicle roof 12 adjacent the door 34. In the event of certain vehicle impact, the curtain airbag 16 inflates to the inflated position adjacent the occupant-seating area 42 and may control the kinematics of the occupant.

The curtain airbag 16 includes main lobe 20 and the inflatable flap 22. The main lobe 20 in the inflated position extends downwardly from the vehicle roof 12. The inflatable flap 22 in the inflated position abuts the airbag inflator assembly 18 and is vehicle-inboard relative to the airbag inflator assembly 18. As set forth above, the inflatable flap 22 is between the occupant and the airbag inflator assembly 18 and the inflatable flap 22 may control the kinematics of the occupant at the airbag inflator assembly 18 in the event of certain vehicle impacts.

In the inflated position the main lobe 20 has an uppermost edge 46 and the inflatable flap 22 has an uppermost edge 48 that is higher than the uppermost edge 46 of the main lobe 20. This provides material of the inflatable flap 22 between the airbag inflator 28 and the occupant-seating area 42 of an adjacent seat 36 in the inflated position.

The curtain airbag 16 includes an outboard panel 50 and an inboard panel 52 vehicle-inboard of the outboard panel 50. In the inflated position, the outboard panel 50 may abut the door 34 of the vehicle 10, i.e., the outboard panel 50 faces vehicle-outboard. In other words, the outboard panel 50 faces away from the passenger compartment 32 in the inflated position. In the inflated position, the inboard panel 52 spaced vehicle-inboard from the outboard panel 50. The inboard panel 52 faces toward the passenger compartment 32, i.e., vehicle-inboard, and may abut the occupant in the event of certain vehicle impacts to the vehicle 10.

The curtain airbag 16 includes an inflation chamber between the outboard panel 50 and the inboard panel 52. In the inflated position, the inboard panel 52 is spaced vehicle-inboard from the outboard panel 50 by the inflation chamber. The airbag inflator 28 is in communication with the inflation chamber. The inflation medium expands the curtain airbag 16 to the inflated position. The inflation chamber extends through the main lobe 20 and the inflatable flap 22. In other words, the main lobe 20 has an inflation chamber and the inflatable flap 22 has an inflation chamber, and the inflation chamber of the main lobe 20 is open to the inflation chamber of the inflatable flap 22 so that as to, in combination, define the inflation chamber of the curtain airbag 16.

The inboard panel 52 may define a portion of the main lobe 20 and a portion of the inflatable flap 22. In other words, part of the inboard panel 52 extends along the main lobe 20 and part of the inboard panel 52 extends along the inflatable flap 22. The outboard panel 50 may define a portion of the main lobe 20 and a portion of the inflatable flap 22. In other words, part of the outboard panel 50 extends along the main lobe 20 and part of the outboard panel 50 extends along the inflatable flap 22. The main lobe 20 may be entirely defined by the inboard panel 52 and outboard panel 50, i.e., the inflation chamber of the main lobe 20 is surrounded only by the combination of part of the inboard panel 52 and part of the outboard panel 50. The inflatable flap 22 may be entirely defined by the inboard panel 52 and the outboard panel 50, i.e., the inflation chamber of the inflatable flap 22 is surrounded only by the combination of part of the inboard panel 52 and part of the outboard panel 50.

The uppermost edge 46 of the main lobe 20 is adjacent the roof rail 30. As discussed above, the curtain airbag 16 extends along the roof rail 30. Specifically, the uppermost edge 46 of the main lobe 20 extends along the roof rail 30. The uppermost edge 46 may extend from near the front end of the passenger compartment 32 to near the rear end of the passenger compartment 32. The outboard panel 50 and the inboard panel 52 may meet at the upper edge of the main lobe 20. For example, the outboard panel 50 and the inboard panel 52 may be two separate panels, i.e., the uppermost edge 46 of the main lobe 20 may be stitched to join the outboard panel 50 and the inboard panel 52. As another example, the outboard panel 50 and the inboard panel 52 may be unitary, i.e., one-piece without seams or joints connecting the outboard panel 50 and the inboard panel 52 with the inflation chamber therebetween. In any event, as set forth above, the inboard panel 52 faces vehicle-inboard and the outboard panel 50 faces vehicle-outboard.

The inflatable flap 22 is positioned adjacent the airbag inflator 28 and abuts the airbag inflator 28 in the inflated position. The inflatable flap 22 is vehicle-inboard relative to the airbag inflator 28 to add thickness to the curtain airbag 16 at the airbag inflator 28, i.e., the inflatable flap 22 is between the airbag inflator 28 and the occupant-seating area 42 of an adjacent seat 36 in the inflated position. The added thickness of the inflatable flap 22 at the airbag inflator 28 may control the kinematics of the occupant of the seat 36 adjacent the airbag inflator 28 in certain vehicle impacts.

The inflation chamber of the inflatable flap 22 fills with inflation medium when the curtain airbag 16 inflates to the inflated position. The main lobe 20 is fluidly connected to the inflatable flap 22, i.e., the inflation chamber of the main lobe 20 is fluidly connected to the inflation chamber of the inflatable flap 22. The main lobe 20 and the inflatable flap 22 are each inflatable by the airbag inflator 28 to the inflated position. The inflatable flap 22 may be indirectly fluidly connected to the airbag inflator 28 through the main lobe 20. In other words, other components of the curtain airbag 16 are between the inflatable flap 22 and the airbag inflator 28. In the examples shown in the Figures, inflation medium passes through from the airbag inflator 28 into the main lobe 20 and then passes through the main lobe 20 and into the inflatable flap 22, i.e., the inflation chamber of the inflatable flap 22.

Figure 4:
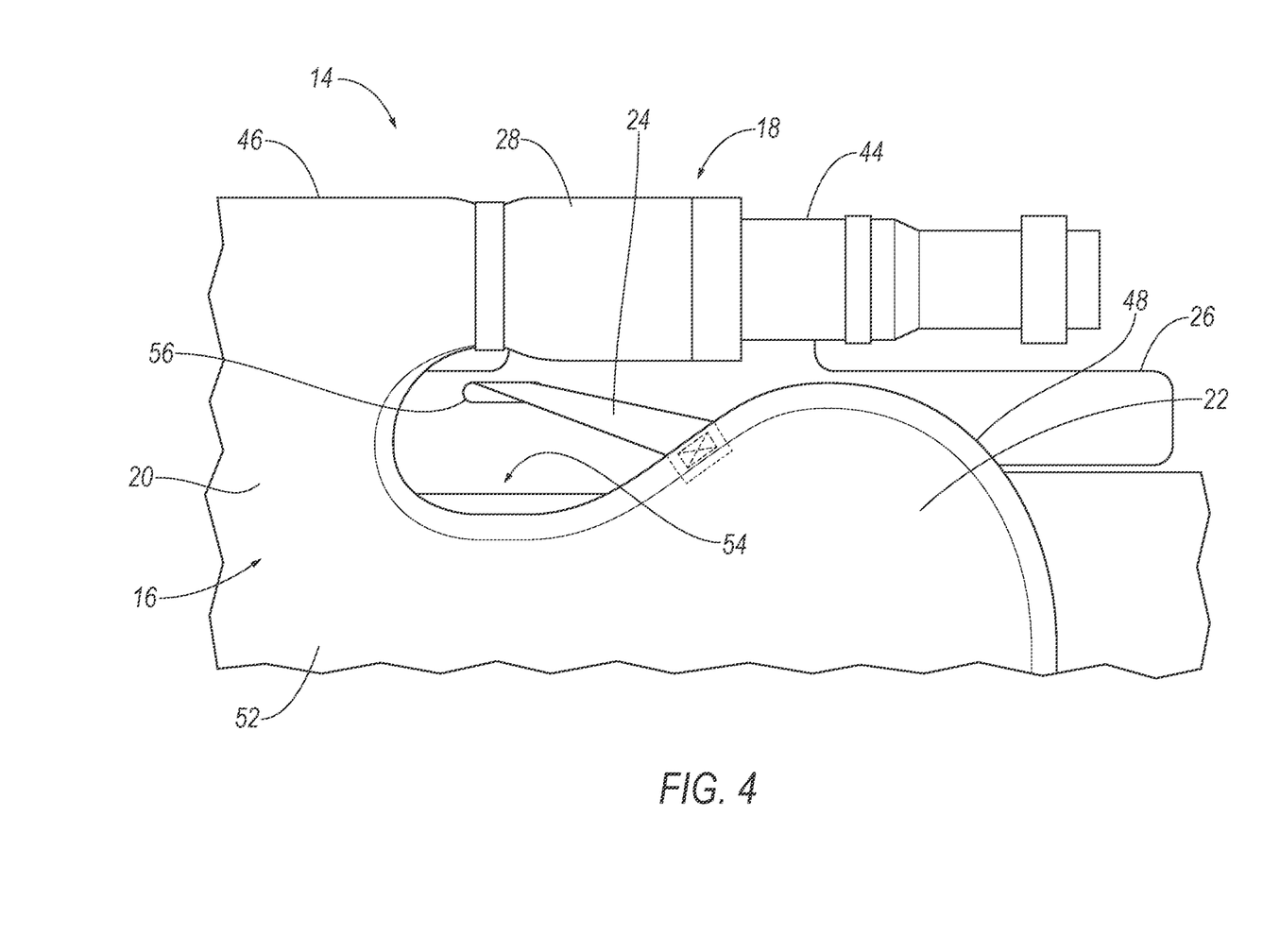
FIG. 4 is a perspective view of the curtain airbag assembly with a curtain airbag uninflated and unfolded.
Figure 5:
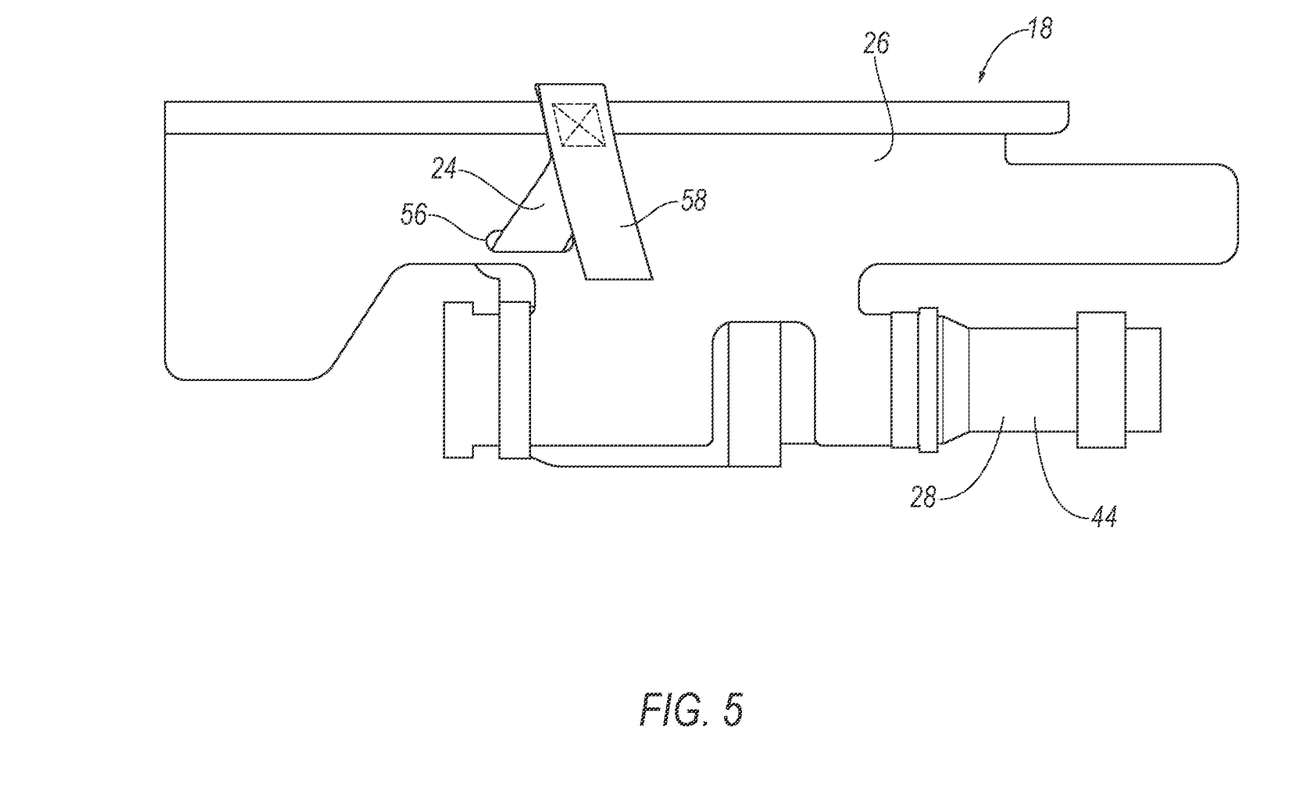
FIG. 5 is a perspective view of a vehicle-outboard side of an airbag inflator assembly showing a tether extending through a bracket of the airbag inflator assembly.

The curtain airbag 16 includes a notch 54. The notch 54 extends along a portion of the main lobe 20 and the inflatable flap 22 in the inflated position. The notch 54 is between the main lobe 20 and the inflatable flap 22 in the inflated position, i.e., the notch 54 spans the transition from the main lobe 20 to the inflatable flap 22. Specifically, the notch 54 is arcuate between the main lobe 20 and the inflatable flap 22 in the inflated position. The notch 54 is lower than the uppermost edge 46 of the main lobe 20 in the inflated position. Specifically, the periphery of the notch 54 extends downwardly from the uppermost edge 46 of the main lobe 20 and curves vehicle-rearward and upward to the inflatable flap 22. The notch 54 defines a void between the main lobe 20 and the inflatable flap 22. In other words, the main lobe 20 and the inflatable flap 22 are spaced from each other at the notch 54. The location of the notch 54 between the main lobe 20 and the inflatable flap 22 and the radius of the arcuate shape of the notch 54 manages stress in the area of the notch 54 during inflation of the main lobe 20 and the inflatable flap 22. The notch 54 in the inflated position is shown in FIGS. 3 and 6. FIGS. 4, 5, and 7 show the curtain airbag assembly 14 uninflated and unfolded, i.e., outside of the vehicle 10, to illustrate details of the notch 54 and the tether 24, 124.

As set forth above, the tether 24, 124 connects the inflatable flap 22 to the airbag inflator assembly 18 in the inflated position. In other words, the airbag inflator assembly 18 provides an anchor point for the inflatable flap 22 to position the inflatable flap 22 relative to the airbag inflator assembly 18. The tether 24, 124 may be fabric, and for example, may be the same type of material as the curtain airbag 16. The tether 24, 124 is anchored to the inflatable flap 22 of the airbag. For example, the tether 24, 124 may be stitched to the inflatable flap 22 (as shown in the Figures), and/or may be ultrasonically welded, bonded, adhered, etc., to the inflatable flap 22.

In the example shown in the example in FIGS. 2-5, the tether 24 is anchored to the bracket 26 and to the inflatable flap 22 in the inflated position. For example, the bracket 26 includes a slot 56 and the tether 24 is engaged with the slot 56. In the example shown in the Figures, the tether 24 extends through the slot 56 and includes a folded end 58 vehicle-outboard of the slot 56 to retain the tether 24, 124 to the slot 56. In such an example, the bracket 26 is between the folded end 58 and the inflatable flap 22. As an example, a vehicle-outboard side of the airbag inflator assembly 18 is shown in FIG. 5 to illustrate the folded end 58. The folded end 58 may be formed by stitching, i.e., is a stitched folded end 58, as shown in FIG. 5.

In the example shown in FIGS. 3-5, the tether 24 extends across the notch 54 in the inflated position. The tether 24 may be anchored to the airbag at the notch 54 in the inflated position. Specifically, in the example shown in the Figures, the tether 24 is anchored to the airbag at a lower end of the of the inflatable flap 22. The tether 24 in the example in FIGS. 3-5 may be anchored to, e.g., stitched to, the inboard panel 52 and/or the outboard panel 50 of the curtain airbag 16. FIG. 4 shows the curtain airbag 16 in the inflated position with the tether 24 extending across the notch 54. FIG. 5 shows the curtain airbag assembly 14 uninflated and unfolded, i.e., outside of the vehicle 10, to further illustrate details the tether 24 and the curtain airbag 16.

In the example shown in FIGS. 6-7, the tether 124 is anchored to the airbag inflator 28 and to the inflatable flap 22. Specifically, the tether 124 is anchored to the housing 44 of the airbag inflator 28. In the example shown in FIGS. 6-7, as an example, the tether 124 is looped around the housing 44 of the airbag inflator 28 and stitched to itself. In that example, the housing 44 of the airbag inflator 28 includes a groove in which the tether 124 is disposed to retain the tether 124 to the housing 44 when the curtain airbag 16 is in the inflated position. In addition and/or in other examples, the tether 124 may be staked, adhered, or otherwise retained to the airbag inflator 28 in any suitable fashion.

In the example shown in FIGS. 6-7, the tether 124 is vehicle-outboard of the inflatable flap 22. In the inflated position. FIG. 6 shows the curtain airbag 16 in the inflated position with the tether 124 vehicle-outboard of the inflatable flap 22. FIG. 7 shows the curtain airbag assembly 14 uninflated and unfolded, i.e., outside of the vehicle 10, with the inflatable flap 22 folded over to illustrate the connection of the tether 124 with the outboard panel 50.

The curtain airbag 16 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a vehicle roof;
a curtain airbag supported by the vehicle roof; and
an airbag inflator assembly mounted to the vehicle roof;
the curtain airbag including a main lobe and an inflatable flap, the main lobe and the inflatable flap each being inflatable by the airbag inflator assembly to an inflated position;
the main lobe in the inflated position extending downwardly from the vehicle roof;
the inflatable flap in the inflated position abutting the airbag inflator assembly;
the inflatable flap having an inboard panel, an outboard panel, and an inflation chamber between the inboard panel and the outboard panel, the inboard panel and the outboard panel being vehicle inboard relative to the airbag inflator assembly in the inflated position; and
the curtain airbag including a tether connecting the inflatable flap to the airbag inflator assembly in the inflated position.

2. The vehicle of claim 1, wherein the airbag inflator assembly includes a bracket mounted to the vehicle roof and an airbag inflator supported by the bracket.

3. The vehicle of claim 2, wherein the tether is anchored to the bracket and to the inflatable flap in the inflated position.

4. The vehicle of claim 3, wherein the curtain airbag includes a notch between the main lobe and the inflatable flap in the inflated position, the tether extending across the notch in the inflated position.

5. The vehicle of claim 4, wherein the tether is anchored to the airbag at the notch in the inflated position.

6. The vehicle of claim 4, wherein the bracket includes a slot and the tether is engaged with the slot.

7. The vehicle of claim 2, wherein the tether is anchored to the airbag inflator and to the inflatable flap.

8. The vehicle of claim 7, wherein the tether is vehicle-outboard of the inflatable flap.

9. The vehicle of claim 1, wherein the curtain airbag includes a notch between the main lobe and the inflatable flap in the inflated position.

10. The vehicle of claim 9, wherein the notch is arcuate between the main lobe and the inflatable flap in the inflated position.

11. The vehicle of claim 9, wherein the main lobe has an uppermost edge and the notch is lower than the uppermost edge of the main lobe in the inflated position.

12. The vehicle of claim 1, wherein in the inflated position the main lobe has an uppermost edge and the inflatable flap has an uppermost edge that is higher than the uppermost edge of the main lobe.

13. The vehicle of claim 1, further comprising a rear vehicle seat, the airbag inflator assembly being aligned with the rear vehicle seat along a vehicle-longitudinal axis.

14. The vehicle of claim 1, wherein the curtain airbag is supported on the vehicle roof by the airbag inflator assembly.

15. A curtain airbag assembly comprising:
an airbag inflator assembly; and
a curtain airbag including a main lobe and an inflatable flap, the main lobe and the inflatable flap each inflatable by the airbag inflator assembly to an inflated position;
the inflatable flap abutting the airbag inflator assembly in the inflated position;
the inflatable flap having an inboard panel, an outboard panel, and an inflation chamber between the inboard panel and the outboard panel, the inboard panel and the outboard panel being inboard relative to the airbag inflator assembly in the inflated position; and
the curtain airbag including a tether connecting the inflatable flap to the airbag inflator assembly in the inflated position.

16. The curtain airbag assembly of claim 15, wherein the airbag inflator assembly includes a bracket and an airbag inflator supported by the bracket, the tether being anchored to the bracket and to the inflatable flap.

17. The curtain airbag assembly of claim 15, wherein the curtain airbag includes a notch between the main lobe and the inflatable flap in the inflated position, the tether extending across the notch in the inflated position.

18. The curtain airbag assembly of claim 17, wherein the notch is arcuate between the main lobe and the inflatable flap in the inflated position.

19. The curtain airbag assembly of claim 17, wherein the tether is anchored to the airbag at the notch.

* * * * *